United States Patent [19]

McVicar et al.

[11] Patent Number: 5,459,588
[45] Date of Patent: Oct. 17, 1995

[54] APPARATUS AND METHOD FOR CLUTCHLESS MOTOR DRIVEN HAND HELD SCANNER

[75] Inventors: David N. McVicar, Fremont; Mohammad A. Safai, San Jose, both of Calif.

[73] Assignee: Logitech, Inc., Fremont, Calif.

[21] Appl. No.: 108,816

[22] Filed: Aug. 18, 1993

[51] Int. Cl.[6] ..................................................... H04N 1/04
[52] U.S. Cl. ................. 358/473; 318/10; 318/15
[58] Field of Search ..................................... 318/685, 696, 318/9, 10, 11, 12, 14, 15; 358/505, 506, 473, 474; 359/17

[56] References Cited

U.S. PATENT DOCUMENTS 4,611,246  9/1986  Nihei .
4,868,676  9/1989  Matsuura et al. .
4,901,164  2/1990  Kurosawa ................................ 358/473
5,182,450  1/1993  Pan ......................................... 358/473 X
5,306,908  4/1994  McConica et al. ..................... 358/473 X
5,330,173  7/1994  Wensink et al. ........................ 358/473 X

FOREIGN PATENT DOCUMENTS

183523  1/1992  Taiwan .

*Primary Examiner*—Bentsu Ro
*Attorney, Agent, or Firm*—Townsend and Townsend Khourie and Crew

[57] ABSTRACT

The present invention provides a hand held scanner with a motorized drive capability. The motorized drive employs a clutchless motor system. In manual operation, the scanner operates as a standard non-motorized scanner in which the user can neither see nor feel any effects of the motor system. In the motorized mode, a worm gear mounted on the motor's drive shaft causes the drive gear/friction wheel assembly to engage the drive rollers.

7 Claims, 10 Drawing Sheets

APPARATUS AND METHOD FOR CLUTCHLESS MOTOR DRIVEN HAND HELD SCANNER

BACKGROUND OF THE INVENTION

This invention relates generally to image scanners. More specifically, the present invention relates to motorized movement of hand held scanners.

Generally, hand held scanners contain a light source, a reflective element, a lens assembly, a detector array, and a set of rollers facilitating movement over an image to be scanned. In operation, the light source emits light onto the image. The light scattered from the image is reflected by the reflector and then focussed through the lens assembly onto the detector array. The detector array scans a single line at a time requiring continuous repositioning of the entire scanner in order to scan the entire image. Typically an operator manually moves the scanner over the image, which sometimes results in image scanner errors. Typical causes of errors include: (i) erratic hand movements due to shaking; (ii) varying scan speeds; (iii) movement which does not follow a straight vertical line along the paper; and (iv) the inability to maintain low speed during high resolution scans.

A motorized scanner can alleviate the above problems. Most motorized scanners are large desk-top size devices in which the image to be scanned is held stationary, and the entire light/reflector/detector assembly is moved, similar to a copying machine. Although such a device reduces image scanner errors, it lacks portability and is often more expensive than hand held scanners.

One device that combines the benefits of the hand held scanner with those of the desk-top scanner is shown in Taiwan Utility Model Application No. 80212207. Two embodiments of the invention are shown. In the first embodiment, a power box containing a motor and gear assembly is manually brought into contact with the scanner's rollers. In the second embodiment, a "float gear" resides between the power box and the roller assembly. Under manual operation, the power box gear assembly is at rest and the rotation of the rollers does not cause the engagement of the float gear. In automatic operation, the power box assembly rotates, causing the float gear to engage the roller assembly.

SUMMARY OF THE INVENTION

The present invention provides a hand held scanner with the capability to either be operated manually, or with an internal motor. A clutchless motor system having a drive gear/friction wheel coupled to the scanner's rollers is employed. In manual operation, the scanner operates as a standard non-motorized scanner in which the user can neither see nor feel any effects of the motor system until the mechanization features are desired.

According to the invention a hand held scanner is disclosed which includes a reversible motor. The motor's drive shaft is coupled to a worm gear. A driver assembly, including a drive gear and a friction wheel, is coupled to the motor assembly through the worm gear. When the motor is rotated in a first direction, the rotation of the worm gear causes the driver assembly to engage the scanner's roller. Once engaged, the rotation of the scanner's roller causes the scanner to move forward. When the direction of the motor's rotation is reversed, the driver assembly disengages from the scanner's roller.

In the preferred embodiment, when manual operation is chosen, the motor drive system is completely disengaged from the scanner. The drive gear/friction wheel assembly does not contact any part of the scanner's roller assembly in this mode, therefore the user has complete freedom to move the scanner. In the manual mode, the hand scanner operates along the scan axis virtually identically to non-motorized versions. The motorized scanner of the preferred embodiment, operating in the manual mode, does not incur any additional internal wear due to the incorporation of the motor system.

In the motorized mode, the user first positions the scanner in preparation for a scan. During this time the scanner operation is no different than that of a non-motorized scanner. Once the scanner is in place, the user starts the automatic scan by pressing a single button. The software then instructs the motor system to first, rotate at a reduced speed during which time the worm gear mounted to the motor's drive shaft rotates the drive gear causing the drive gear/friction wheel assembly to engage the drive roller and second, ramp up to normal operating speed during the actual scan (operating speed determined by required scan resolution). Once the scan is complete the user releases the button which causes the motor to stop and then automatically reverse in direction for a preselected number of steps, thus disengaging the drive gear/friction wheel assembly.

The present invention, due to its clutchless motor system, minimizes possible wear and tear incurred by the scanner during manual operation. There is no contact between the drive assembly and the roller assembly during manual operation. This has the added benefit of allowing the scanner to be manually moved in either the forward or reverse direction along the scan axis.

Reference to the remaining portions of the specification and the drawings realize a further understanding of the nature and advantages of the invention.

DESCRIPTION OF A SPECIFIC EMBODIMENT

Figure 1:
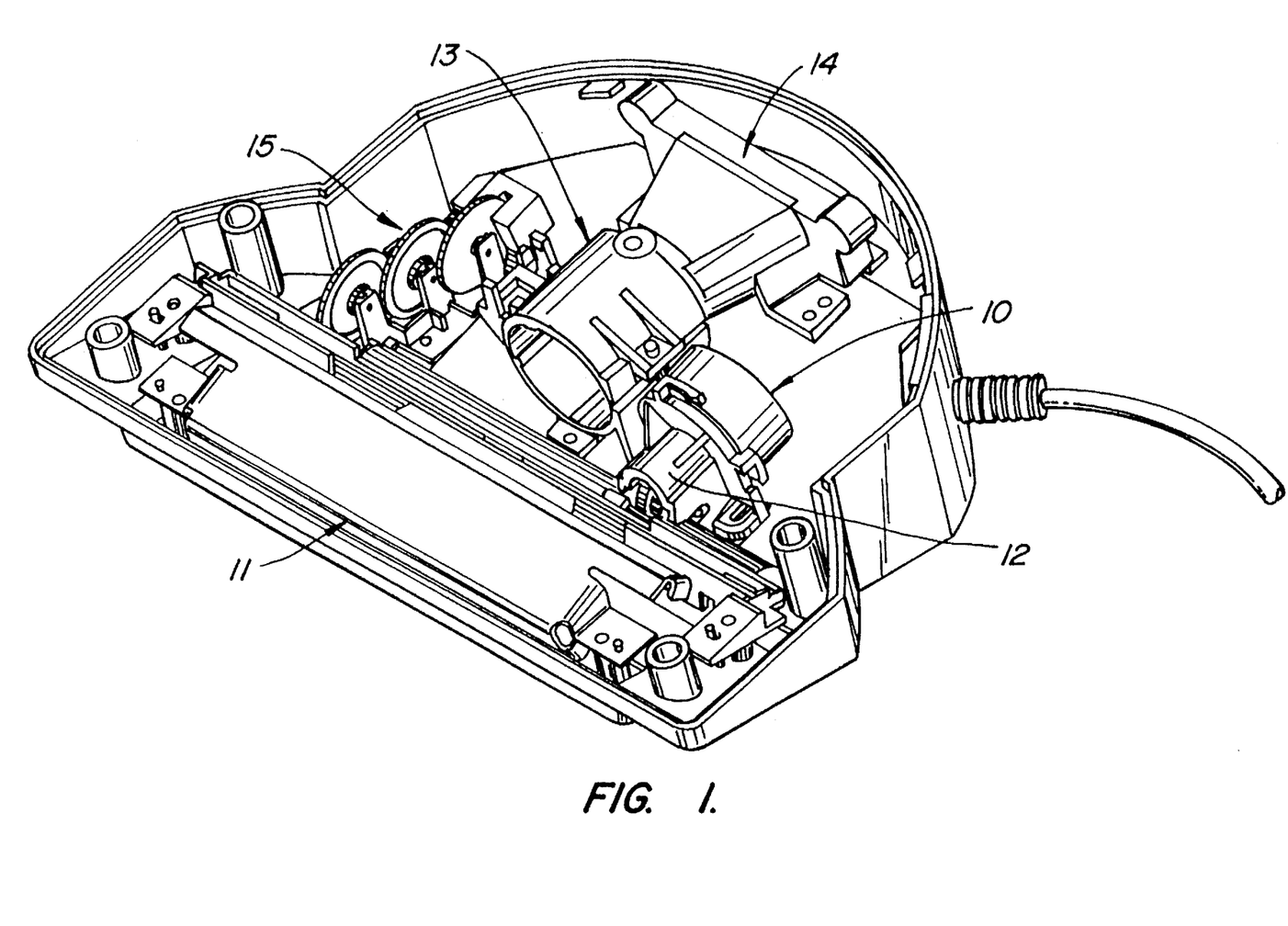
FIG. 1 is a diagram showing the internal layout of a scanner.

FIG. 1 is an internal view of a scanner. Motor drive assembly 10 is shown in its normal operating configuration. Gear housing 12 serves a dual purpose; first, the drive gear/friction wheel assembly 22 is mounted within two slots in housing 12 and second, housing 12 acts as a protective cover, minimizing the collection of dust and other forms of contamination on the drive assembly's gears, thus helping to maintain its smooth operation. A light assembly 11 is also shown in this figure. Light assembly 11 contains the light source and the reflector element. Generally either a fluorescent light or an LED bar is used as the light source. Light scattered from an image is reflected into a lens assembly 13 which focusses the scattered light onto a detector array 14.

Figure 2:
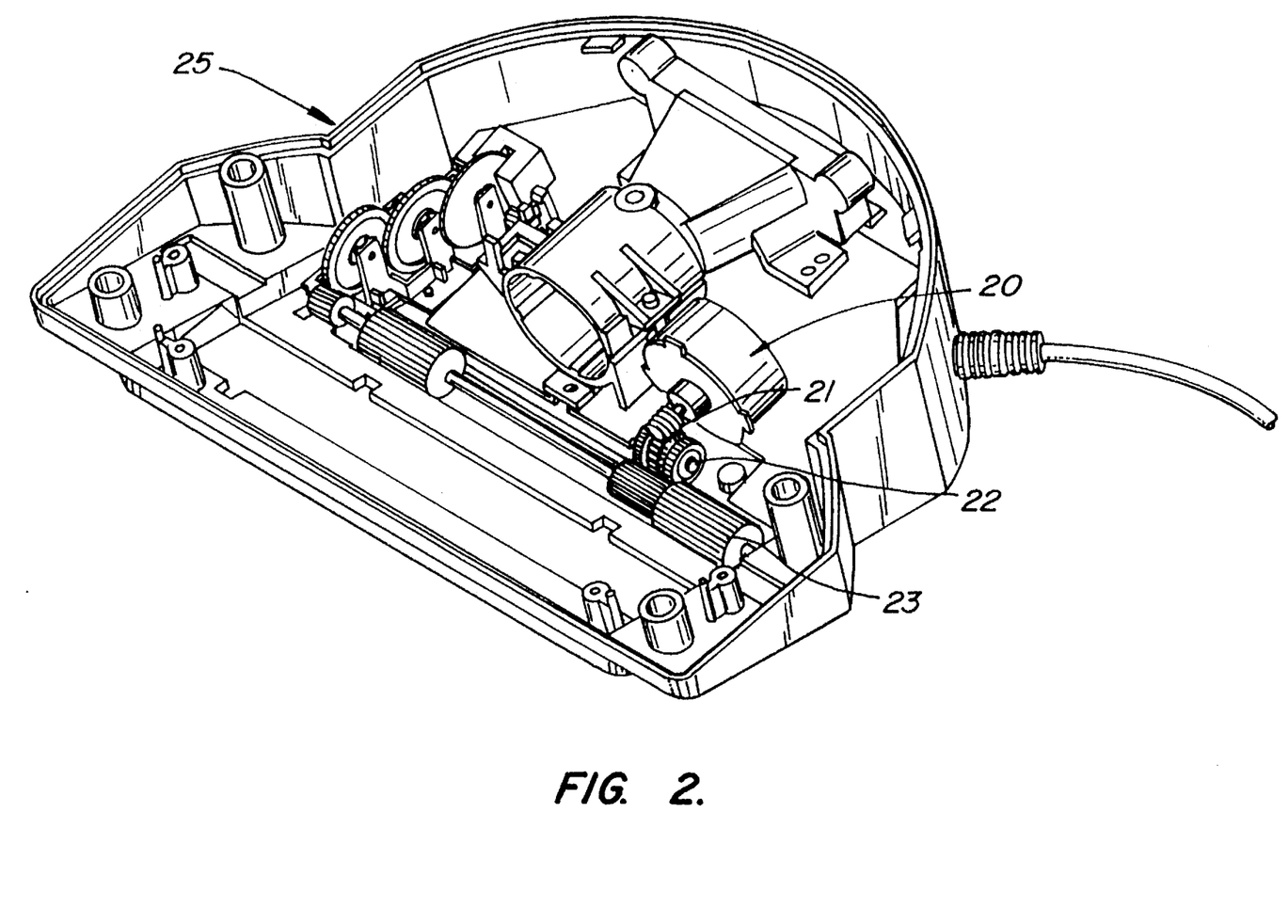
FIG. 2 is a diagram showing the internal layout of a scanner without the light assembly and the protective cover of the drive system.

FIG. 2 is a second view of the internal layout of the scanner shown in FIG. 1, without the light assembly 11 and gear housing 12 in order to show the internal drive system of assembly 10. A worm gear 21 is mounted on the drive shaft of stepping motor 20. Worm gear 21 in turn drives a friction wheel assembly 22. In this figure, assembly 22 has engaged the scanner drive shaft and roller assembly 23. The rotation of assembly 23 causes the movement of scanner 25.

Figure 3A:
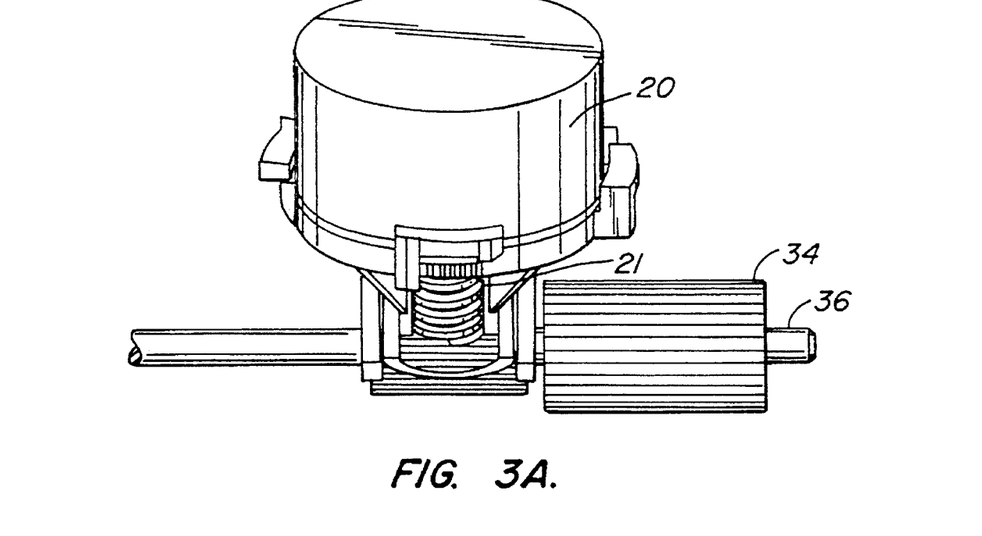
FIG. 3A is the top view of the drive assembly.
Figure 3B:
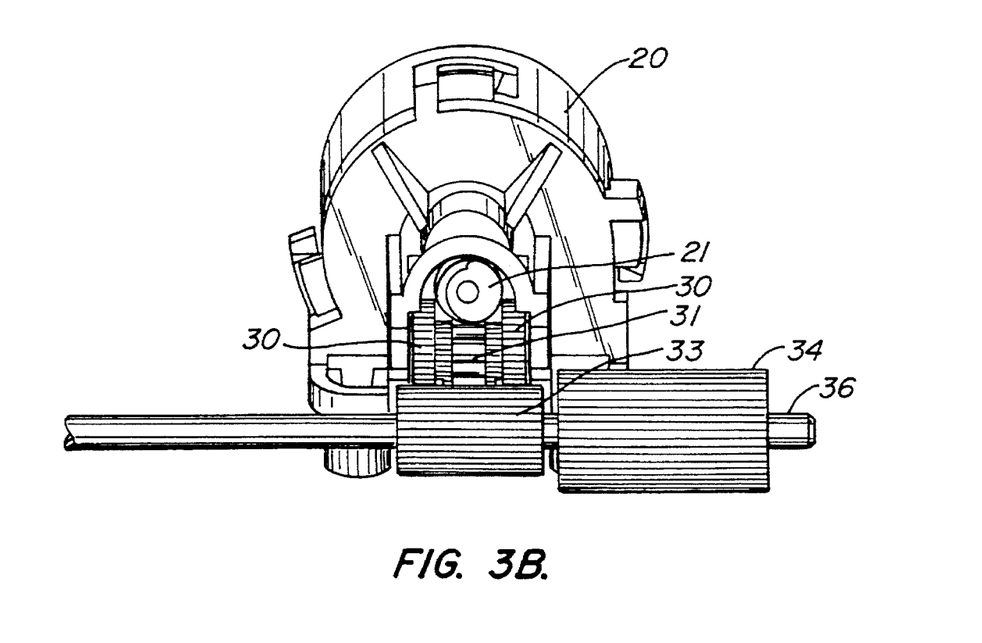
FIG. 3B is the front view of the drive assembly.
Figure 3C:
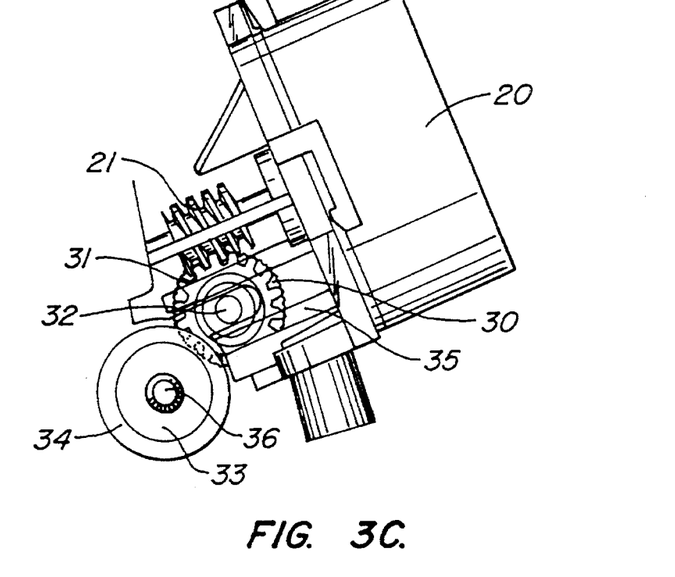
FIG. 3C is the side view of the drive assembly.
Figure 3D:
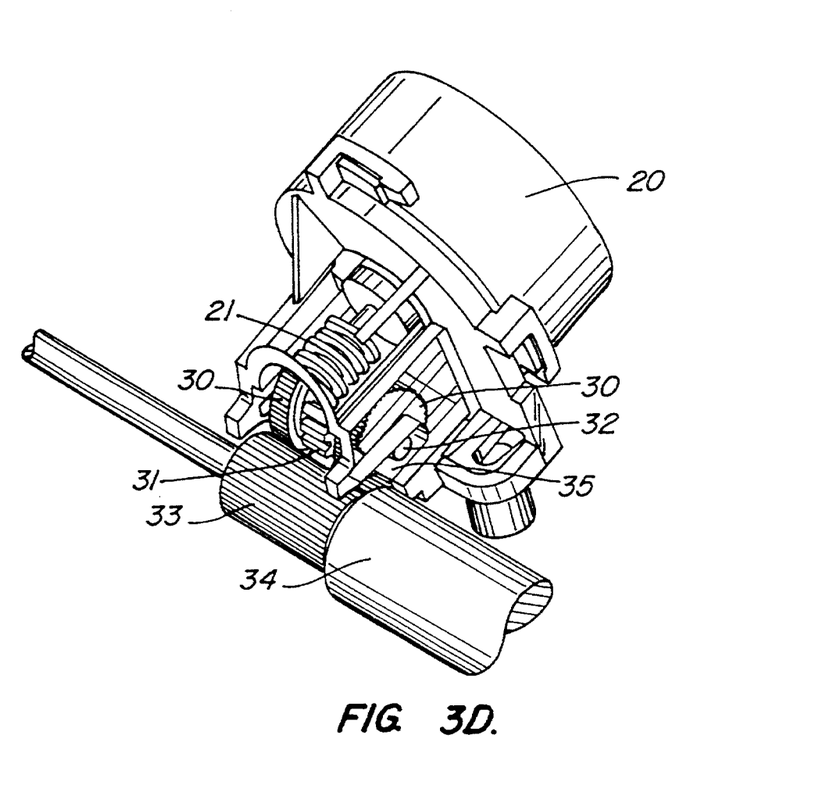
FIG. 3D is a skewed view of the drive assembly.

FIGS. 3A–D show four perspectives of drive assembly 10. FIG. 3A is the top view of the assembly; FIG. 3B is the front view of the assembly; FIG. 3C is the side view of the assembly; and FIG. 3D is a skewed view of the assembly. Worm gear 21 is mounted directly onto the output shaft of motor 20. As the worm gear 21 rotates, it imparts a force to drive gear 31. Shaft 32 of the drive gear/friction wheel assembly 22 is mounted in slotted housing 35, thus allowing the friction wheel to be either engaged or disengaged from drive roller 33. A drive roller 33 is mounted on main drive shaft 36. Scanner rollers 34, also mounted on drive shaft 36, rotate as drive roller 33 rotates, causing the scanner to move on its own power.

Figure 4:
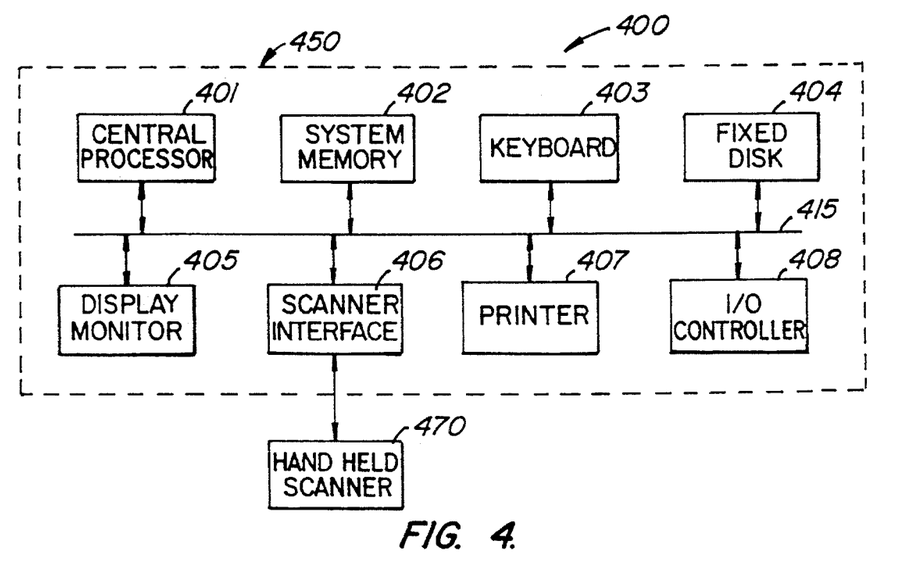
FIG. 4 is a scanning system embodying a preferred embodiment of the present invention.

FIG. 4 is a scanning system 400 embodying a preferred embodiment of the present invention. The scanning system 400 includes a computer system 450 coupled to the hand held scanner 470. The computer system comprises a central processor 401, a system memory 402, an input device such as a keyboard 403, a fixed disk 404, a display 405, a scanner interface 406, a printer 407, and an input/output (I/O) controller 408. A system bus 415 couples all the components of the computer system 450, providing a link between all of them.

Scanner interface 406 couples computer system 450 to hand held scanner 470. Interface 406 provides pulses of a given polarity and rate to stepping motor 20. These pulses determine the direction of rotation of motor 20 and thus whether drive gear/friction wheel assembly 22 engages or disengages from drive roller 33. Interface 406 also controls the pulse rate ramping function, allowing for a gradual increase in pulse rate, thus providing a smooth transition from the manual mode of operation to that of the motorized mode.

Figure 5:
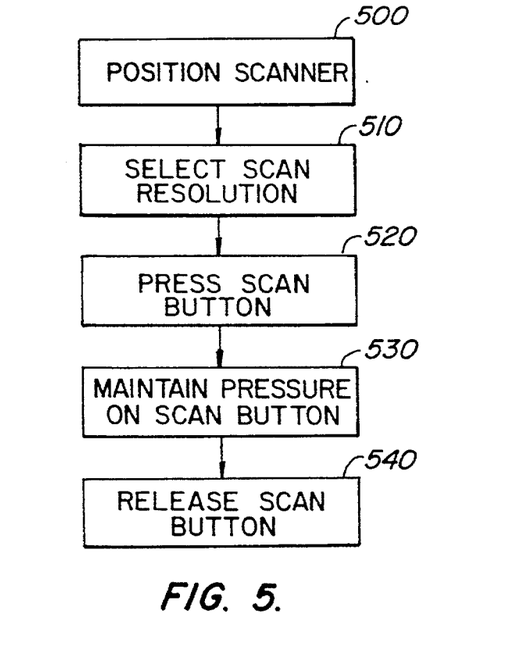
FIG. 5 is a flowchart showing the operation of the motorized scanner in the preferred embodiment.

FIG. 5 is a flowchart showing the operation of the motorized scanner in the preferred embodiment. First the user manually positions the scanner at the beginning of the page to be scanned (step 500). Next the user selects the desired scanning resolution (step 510). The scan speed is computed based on this resolution. To begin scanning, the user presses a button on the scanner (step 520). Pressure is maintained on the scan button throughout the scanning operation (step 530). This pressure serves two purposes; first, to instruct the scanner to continue its scan and second, to supply downward pressure to the scanner. Note that under normal operating conditions the scanner's own weight applies sufficient downward pressure to the scanner's rollers do insure that they will not slip during the scanning operation. After the scan is complete, the user removes pressure from the scan button (step 540), thus automatically disengaging the motor drive.

In a second embodiment, the scan button must only be pressed once to initialize the scan. The scan then continues for a set number of steps or for a set length of time, the length of the page defining the required number of steps or period of time. In this embodiment the user, prior to beginning the scan, selects the length of page to be scanned. The scanner is given sufficient weight to insure that it does not slip during the scanning operation. In a third embodiment, the scan speed selection, scan start, and scan end, are all performed remotely through commands entered using the computer keyboard. In a fourth embodiment, the scanner is only operable in the automatic/motorized mode. By removing the scanner's manual capability the scanner can be significantly simplified since there is no longer a need for the gear/encoder assembly 15 used to monitor scanner movement during manual operation. During motorized operation, the monitoring of the scanner's movement can be accomplished by either counting motor pulses or measuring a period of time.

Figure 6:
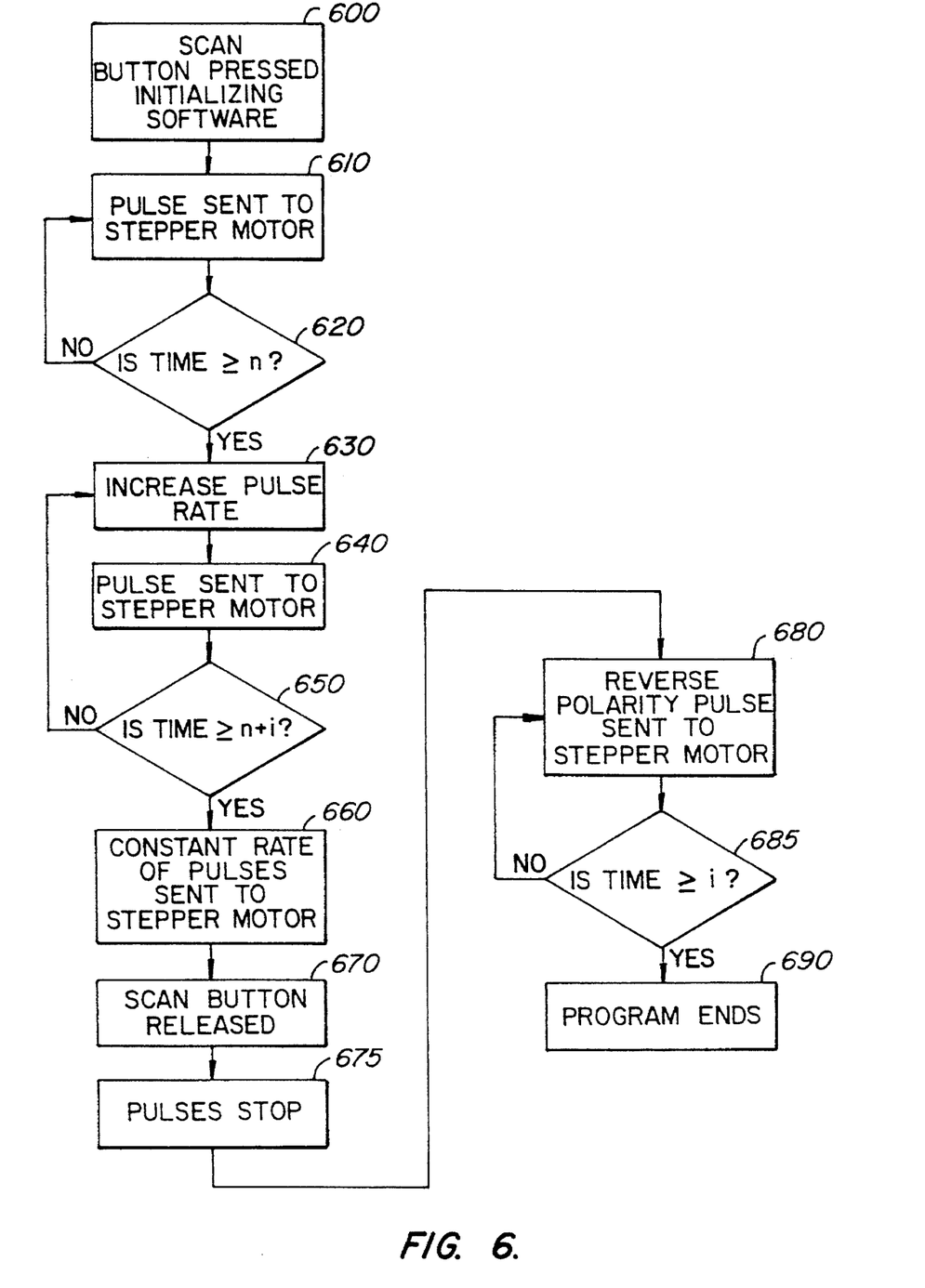
FIG. 6 is a flow chart illustrating the operation of the software in the preferred embodiment.

FIG. 6 is a flow chart illustrating the operation of the software in the preferred embodiment. In this embodiment all instructions necessary for motorized scanning are stored in ROM or in firmware and all of the required hardware is mounted within the body of the scanner. Thus the scanner does not require that any changes be made to the computer system/scan software to operate the scanner in the motorized mode.

The software is initialized when the user presses the scan button mounted on the scanner (step 600). Once initialized, the software sends a pulse (square wave) to the stepper motor (step 610). The polarity is chosen so that the motor steps in a counterclockwise rotation. The pulse rate is purposefully chosen to be relatively slow so that the engagement of drive gear/friction wheel assembly 22 with drive roller assembly 23 is smooth. The period of time that pulses are being sent to the motor is monitored and compared to a predetermined value n (step 620). The value of n is chosen so that after the motor has been running for n nanoseconds, drive gear/friction wheel assembly 22 is completely engaged.

After pulsing the stepper motor for a period of n nanoseconds, the pulse rate is increased (step 630) and a pulse is sent to the stepper motor (step 640). The ramping of the pulse rate continues until the stepper motor has been operating for a period of n+j nanoseconds (step 650). Once the operational period reaches a time of n+j nanoseconds, the pulses continue to be sent to the stepper motor with no further increase in rate (step 660) until the scan button is released (step 670). The constant pulse rate is determined by the user's resolution selection. When the scan button is released, the pulses first stop (step 675) and then a reverse polarity pulse is sent to the stepper motor (step 680) causing it to rotate in a clockwise fashion. Reverse polarity pulses continue to be sent to the stepper motor for a period of time i (step 685) at which time the program ends (step 690).

Figure 7:
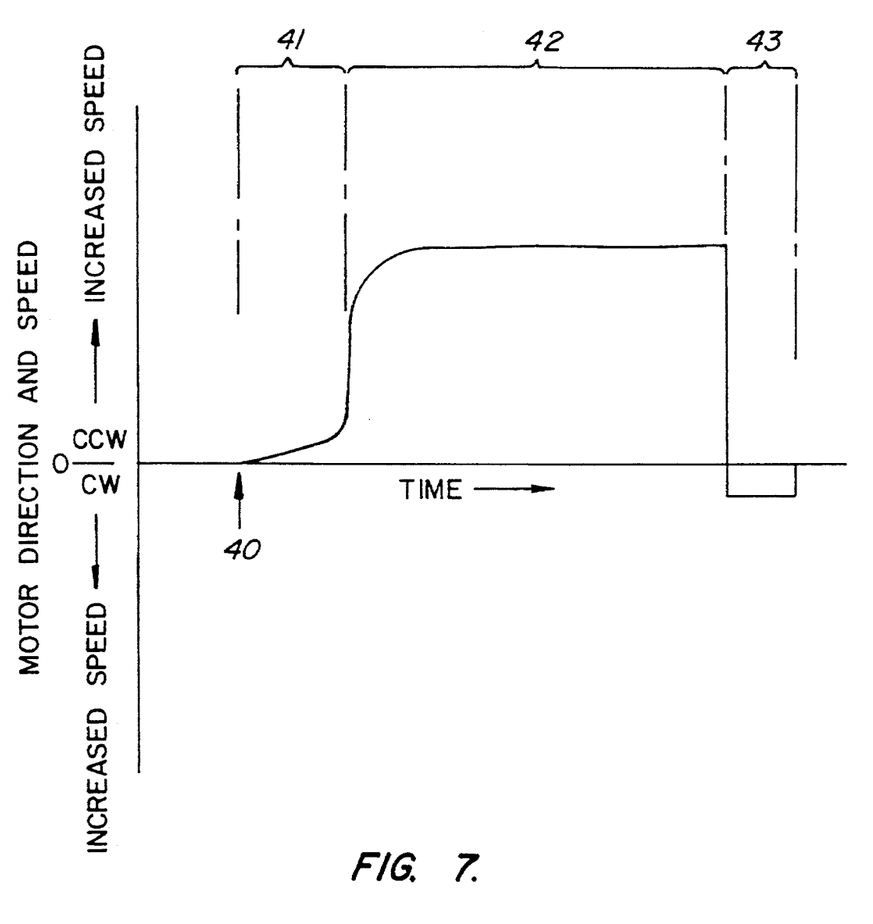
FIG. 7 is an illustration of the stepper motor control timing sequence.

FIG. 7 is an illustration of the stepper motor control sequence. At time 40 the motor drive system is initialized. During the initial drive engagement period 41, the stepper motor rotates at a reduced speed counterclockwise for a predetermined period of time. The amount of time within period 41 is small, being sufficient to engage friction wheels 30 with drive roller 33. After drive roller 33 is engaged, the speed of the stepper motor ramps up to the normal speed as shown in time period 42. Once the scan has been completed, the drive motor stops its counterclockwise rotation and begins to rotate clockwise at a reduced speed for a predetermined period of time (period 43). The rotation during period 43 disengages the friction wheels 30 from drive roller 33.

Figure 8:
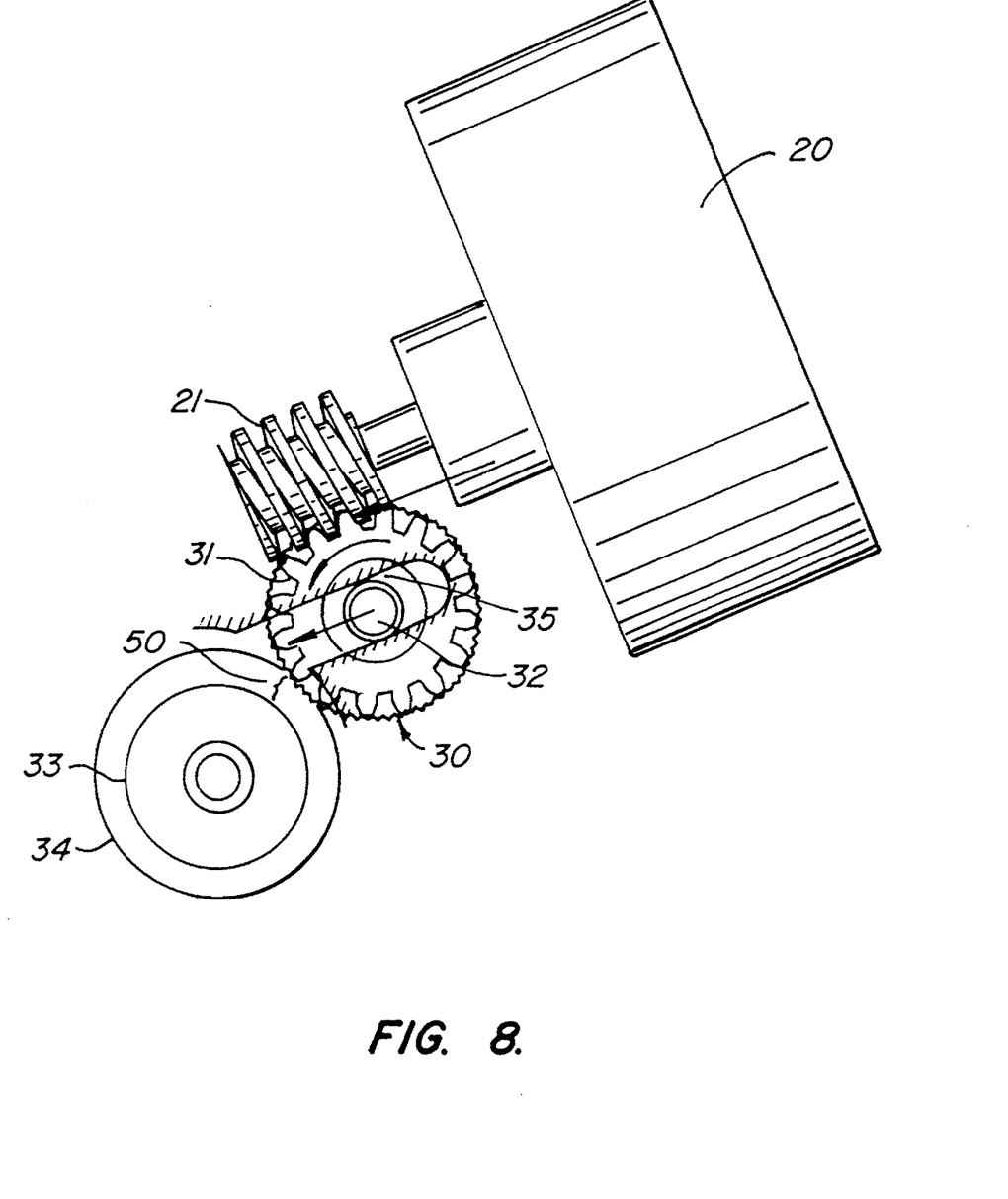
FIG. 8 is a detailed view of the drive assembly illustrating the engagement procedure.

FIG. 8 is a detailed view of drive assembly 10 illustrating the engagement procedure. Prior to engagement, space 50 separates friction wheels 30 and drive roller 33, thus allowing the drive rollers to rotate freely. After the motorized scanning mode has been selected, the drive shaft of stepping motor 20, to which worm gear 21 is attached, rotates at a reduced speed counterclockwise for a predetermined set of steps. The speed of motor 20 is reduced during this period from its normal operating speed to insure a smooth engagement of friction wheels 30 with drive roller 33. As worm gear 21 rotates, it imparts a force to the teeth of drive gear 31. This force causes drive gear 31 to rotate counterclockwise. Simultaneously this force causes drive gear 31 to move away from motor 20 and towards drive roller 33. Drive gear 31 and friction wheels 30 are both mounted to shaft 32. Shaft 32 is contained in slot 35. As drive gear 31 and friction wheels 30 rotate counterclockwise, the assembly 'walks' down the ramps created by slot 35 until friction wheels 30 engage drive roller 33.

Figure 9:
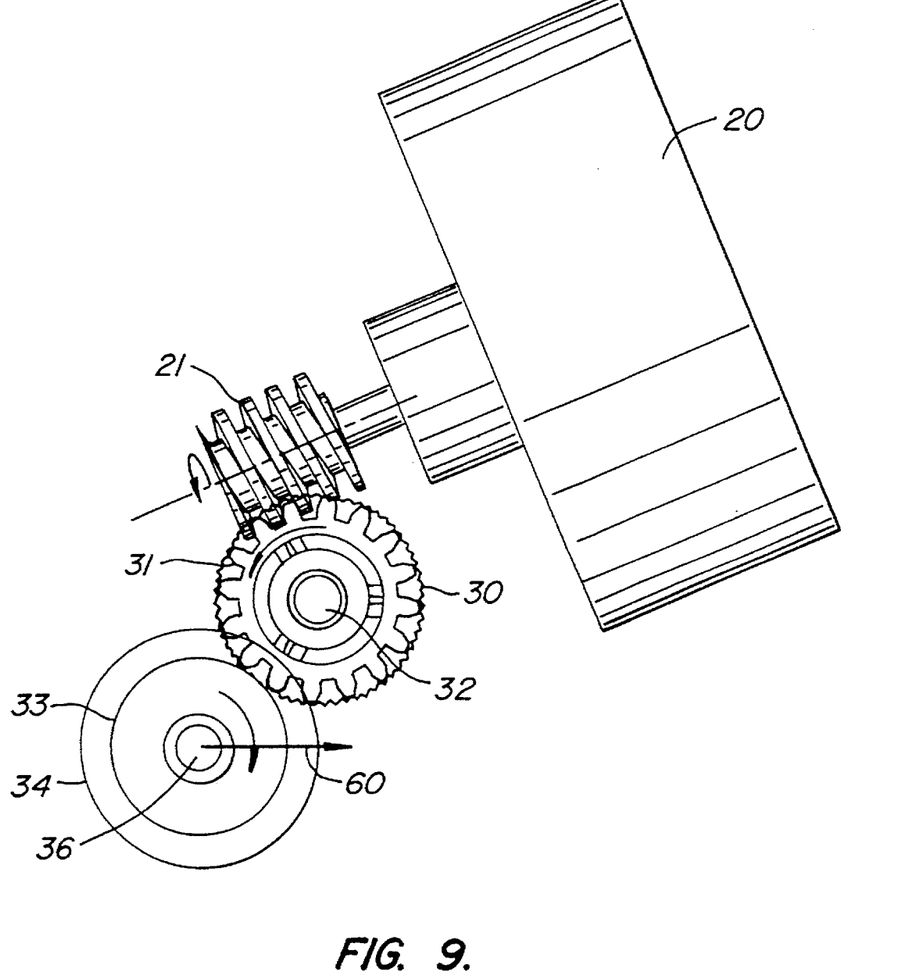
FIG. 9 is a detailed view of the engaged drive assembly.

FIG. 9 shows the drive assembly engaged. After friction wheels 30 engage drive roller 33, motor 20 ramps up to its scanning speed. After engagement, friction wheels 30 attempt to climb drive roller 33 due to the friction between friction wheels 30 and drive roller 33. This upward movement is stopped by the wedging effect of the friction wheel 30/drive gear 31 assembly between the drive roller 33 and the worm gear 21. Friction wheels 30 continue to rotate about shaft 32, imparting a force to drive roller 33, causing it to rotate clockwise about shaft 36. Scanner rollers 34 are also mounted to shaft 36 and therefore will also be forced to rotate in a clockwise fashion. The rotation of scanner rollers 34 cause the scanner to move in direction 60.

Figure 10:
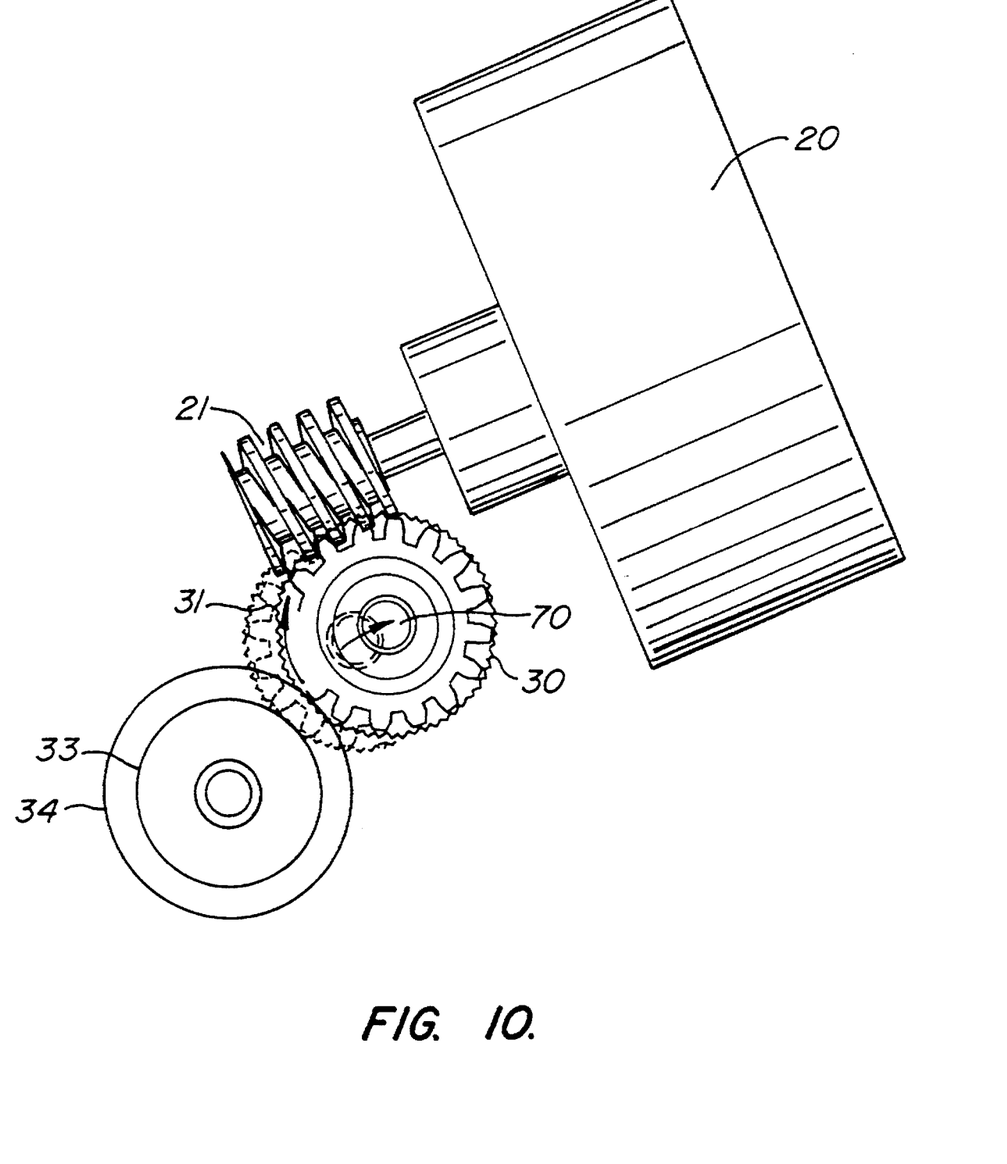
FIG. 10 illustrates the disengagement procedure.

FIG. 10 illustrates the disengagement procedure. After the scan has been completed, stepping motor 20 stops its counterclockwise motion and rotates clockwise for a predetermined period of time. The clockwise rotation of worm gear 21 causes drive gear 31 to rotate clockwise. Simultaneously this force causes the assembly comprised of drive gear 31 and friction wheels 30 to walk up the ramp (direction 70), thus disengaging from drive roller 33. Power to the motor is discontinued after a predetermined period of time. At this point the scanner rollers are completely free to move, unencumbered by the drive assembly which is now at the upper end of slot 35.

As will be understood by those familiar with the art, the present invention may be embodied in other specific forms without departing from the spirit or essential characteristics thereof. For example, initialization of the motorized scan mode could be selected by pressing a button on the scanner or by selecting a motorized scan mode using a computer and keyboard. Accordingly, disclosure of the preferred embodiment of the invention is intended to be illustrative, but not limiting, of the scope of the invention which is set forth in the following claims.

We claim:

1. A hand-scanner drive assembly, comprising:

a reversible motor including a drive shaft;

a worm gear coupled to said drive shaft;

a frame, proximate said worm gear, including a pair of opposed slots; and a drive assembly including a drive gear coupled to said worm gear and a wheel, said wheel co-rotationally secured to said drive gear and adapted to contact and rotate a roller of a hand scanner, said driver assembly rotatably and slidably coupled to said opposed slots for translation between a first position towards the roller for engagement and rotation of said roller by said wheel upon rotation of said drive shaft in a first direction and a second position away from said roller for disengagement of said wheel from said roller upon rotation of said drive shaft in a second direction.

2. The hand-scanner drive assembly as recited in claim 1 wherein said reversible motor is a stepper motor.

3. The hand-scanner drive assembly as recited in claim 1 further comprising means for gradually increasing the rotational rate of said reversible motor during the engagement of said drive assembly to said roller.

4. A method for motorizing a hand scanner having a roller, comprising the steps of:

rotating and concurrently translating a wheel adapted to contact and drive the roller of the hand scanner towards the roller until engagement of said wheel and said roller occurs; and thereafter rotating said wheel engaging the roller to drive the hand scanner during a scan.

5. The motorizing method of claim 4 further comprising the step of:

gradually increasing the rotational rate of said wheel until engagement of said wheel and said roller occurs; and thereafter rotating said wheel at a constant rate to drive the hand scanner at a constant rate during a scan.

6. The motorizing method of claim 4 further comprising the step of:

translating said wheel away from the roller to disengage said wheel from the roller after said scan.

7. A hand-scanner drive assembly, comprising:

a reversible motor including a drive shaft;

a worm gear coupled to said drive shaft;

a frame, proximate said worm gear, including a pair of slots; and means, coupled to said worm gear, for concurrent rotation and translation of a wheel adapted for engagement with a surface of a roller of a hand scanner when said reversible motor rotates in a first direction, wherein said wheel rotates without translation after engagement of the roller, said rotation and translation means translating said wheel to disengage said wheel from said roller when said reversible motor rotates in a second direction.

* * * * *